US011499766B2

United States Patent
Verma et al.

(10) Patent No.: US 11,499,766 B2
(45) Date of Patent: Nov. 15, 2022

(54) ELECTRIC EXPANSION VALVE, A HEAT EXCHANGE SYSTEM AND A METHOD OF CONTROLLING THE ELECTRIC EXPANSION VALVE

(71) Applicant: Carrier Corporation, Palm Beach Gardens, FL (US)

(72) Inventors: Parmesh Verma, South Windsor, CT (US); Yinshan Feng, Manchester, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 99 days.

(21) Appl. No.: 16/837,547

(22) Filed: Apr. 1, 2020

(65) Prior Publication Data

US 2020/0318878 A1 Oct. 8, 2020

(30) Foreign Application Priority Data

Apr. 2, 2019 (CN) .......................... 201910261015.6

(51) Int. Cl.
*F25B 49/02* (2006.01)
*F25B 41/34* (2021.01)

(52) U.S. Cl.
CPC .............. *F25B 49/02* (2013.01); *F25B 41/34* (2021.01); *F25B 2500/05* (2013.01);
(Continued)

(58) Field of Classification Search
CPC .............. F25B 2500/05; F25B 2600/21; F25B 2600/2513; F25B 2700/21151;
(Continued)

(56) References Cited

U.S. PATENT DOCUMENTS 5,904,049 A * 5/1999 Jaster ...................... F25B 41/31
62/204
7,509,817 B2 * 3/2009 Hwang .................. F25B 13/00
62/210

(Continued)

FOREIGN PATENT DOCUMENTS

CN 104990294 A 10/2015
EP 3023716 A1 5/2016
(Continued)

OTHER PUBLICATIONS

European Search Report for Application No. 20164901.9; dated Aug. 25, 2020; 7 Pages.

*Primary Examiner* — Henry T Crenshaw
(74) *Attorney, Agent, or Firm* — Cantor Colburn LLP

(57) ABSTRACT

An electronic expansion valve, a heat exchange system, and a control for controlling an electronic expansion valve. The electronic expansion valve includes: a valve body; a first temperature sensor configured to detect an evaporator temperature $T_{eva}$; a second temperature sensor configured to detect a compressor inlet temperature $T_{suc}$; a third temperature sensor configured to detect a compressor outlet temperature $T_{dis}$; a fourth temperature sensor configured to detect a condenser temperature $T_{con}$; and a controller, which is associated with the first temperature sensor, the second temperature sensor, the third temperature sensor and the fourth temperature sensor, and which adjusts an opening degree of the valve body based on temperature signals from the first temperature sensor, the second temperature sensor, the third temperature sensor and the fourth temperature sensor.

9 Claims, 2 Drawing Sheets

(52) U.S. Cl.
CPC ............. *F25B 2600/2513* (2013.01); *F25B 2700/2116* (2013.01); *F25B 2700/2117* (2013.01); *F25B 2700/21151* (2013.01); *F25B 2700/21152* (2013.01)

(58) Field of Classification Search
CPC .... F25B 2700/21152; F25B 2700/2116; F25B 2700/2117; F25B 41/31; F25B 41/34; F25B 49/02
See application file for complete search history.

(56) References Cited

U.S. PATENT DOCUMENTS

| | | | | |
|---|---|---|---|---|
| 2014/0137585 | A1* | 5/2014 | Lu | F25B 49/02 62/126 |
| 2015/0027149 | A1* | 1/2015 | Seunghyeon | F25B 41/31 62/115 |
| 2015/0135749 | A1* | 5/2015 | Ohta | F25B 49/02 62/151 |
| 2015/0267930 | A1* | 9/2015 | Ryu | F25B 49/02 62/503 |
| 2015/0285539 | A1* | 10/2015 | Kopko | F25B 49/02 62/115 |
| 2015/0345846 | A1* | 12/2015 | Kopko | F25B 49/02 62/115 |

FOREIGN PATENT DOCUMENTS

| | | | |
|---|---|---|---|
| WO | 2018107982 | A1 | 6/2018 |
| WO | WO 2018-107982 | * | 6/2018 |

* cited by examiner

ELECTRIC EXPANSION VALVE, A HEAT EXCHANGE SYSTEM AND A METHOD OF CONTROLLING THE ELECTRIC EXPANSION VALVE

FOREIGN PRIORITY

This application claims priority to Chinese Patent Application No. 201910261015.6, filed Apr. 2, 2019, and all the benefits accruing therefrom under 35 U.S.C. § 119, the contents of which in its entirety are herein incorporated by reference.

FIELD OF THE INVENTION

The present disclosure relates to the field of heat exchange systems, and more particularly, the present disclosure relates to an electronic expansion valve in a heat exchange system, and a control method thereof.

BACKGROUND OF THE INVENTION

Expansion valves are important components in heat exchange systems such as refrigeration devices. Generally, expansion valves includes thermal expansion valves and electronic expansion valves. An electronic expansion valve is typically provided with a temperature sensor and a pressure sensor at a location of an outlet of an evaporator. The temperature sensor and the pressure sensor transmit temperature signals and pressure signals to a controller so that a superheat degree of a refrigerant fluid at an inlet of a compressor is calculated, and an opening degree of a valve body of the electronic expansion valve is adjusted based on the superheat degree. Although the electronic expansion valve has the advantages of programmability and high control accuracy, the high price prevents it from wide application. The pressure sensor is an expensive component in the electronic expansion valve. For example, in a 2-ton electronic expansion valve, the pressure sensor may account for a quarter or more of the cost of the entire electronic expansion valve.

SUMMARY OF THE INVENTION

An object of the present disclosure is to solve or at least alleviate the problems existing in the related art.

According to some embodiments, the present disclosure provides an electronic expansion valve, which includes: a valve body; a first temperature sensor configured to detect an evaporator temperature $T_{eva}$; a second temperature sensor configured to detect a compressor inlet temperature $T_{suc}$; a third temperature sensor configured to detect a compressor outlet temperature $T_{dis}$; a fourth temperature sensor configured to detect a condenser temperature $T_{con}$; and a controller, which is associated with the first temperature sensor, the second temperature sensor, the third temperature sensor and the fourth temperature sensor, and which adjusts an opening degree of the valve body based on temperature signals from the first temperature sensor, the second temperature sensor, the third temperature sensor and the fourth temperature sensor.

Optionally, in the electronic expansion valve, the controller controls the opening degree of the valve body based on a first control parameter $Ctrl_{suc}$ and/or a second control parameter $Ctrl_{dis}$, wherein the first control parameter $Ctrl_{suc}$ is related to the evaporator temperature $T_{eva}$ and the compressor inlet temperature $T_{suc}$, and the second control parameter $Ctrl_{dis}$ is related to the compressor outlet temperature $T_{dis}$ and the condenser temperature $T_{con}$.

Optionally, in the electronic expansion valve, the first control parameter $Ctrl_{suc}$ is a function of a first difference between a suction-side superheat degree $SH_{suc}$ and a set value $SH_{sp1}$ of the suction-side superheat degree, wherein the suction-side superheat degree $SH_{suc}=T_{suc}-T_{eva}$; and the second control parameter $Ctrl_{dis}$ is a function of a second difference between a discharge-side superheat degree $SH_{dis}$ and a set value $SH_{sp2}$ of the discharge-side superheat degree, wherein the discharge-side superheat degree $SH_{dis}=T_{dis}-T_{con}$.

Optionally, in the electronic expansion valve, the controller controls the opening degree of the valve body by a larger value based on the first control parameter $Ctrl_{suc}$ and the second control parameter $Ctrl_{dis}$.

Optionally, in the electronic expansion valve, the electronic expansion valve does not include a pressure sensor A heat exchange system is also provided, which includes: a compressor; a condenser connected to an outlet of the compressor; an electronic expansion valve according to an embodiment of the present disclosure, disposed downstream of the condenser; and an evaporator downstream of the electronic expansion valve, the evaporator being connected to an inlet of the compressor.

In the system, the first temperature sensor is disposed in the evaporator, the second temperature sensor is disposed between the evaporator and the inlet of compressor, the third temperature sensor is disposed between the outlet of the compressor and the condenser, and the fourth temperature sensor is disposed in the condenser.

A method for controlling an opening degree of an electronic expansion valve is also provided, the method including: setting a set value $SH_{sp1}$ of a suction-side superheat degree and a set value $SH_{sp2}$ of a discharge-side superheat degree; obtaining a suction-side superheat degree $SH_{suc}$ and a discharge-side superheat degree $SH_{dis}$; calculating a first difference between the suction-side superheat degree $SH_{suc}$ and the set value $SH_{sp1}$ of the suction-side superheat degree, and calculating a first control parameter $Ctrl_{suc}$ based on the first difference; and calculating a second difference between the discharge-side superheat degree $SH_{dis}$ and the set value $SH_{sp2}$ of the discharge-side superheat degree, and calculating a second control parameter $Ctrl_{dis}$ based on the second difference; and controlling an opening degree of a valve body of the electronic expansion valve based on the first control parameter $Ctrl_{suc}$ and/or the second control parameter $Ctrl_{dis}$.

Optionally, the step of obtaining the suction-side superheat degree $SH_{suc}$ includes: collecting an evaporator temperature T, and a compressor inlet temperature $T_{suc}$ using temperature sensors; and calculating the suction-side superheat degree $SH_{suc}$ by using a formula $SH_{suc}=T_{suc}-T_{eva}$; and the step of obtaining the discharge-side superheat degree $SH_{dis}$ includes: collecting a compressor outlet temperature $T_{dis}$ and a condenser temperature $T_{con}$ using temperature sensors; and calculating the discharge-side superheat degree $SH_{dis}$ by using a formula $SH_{dis}=T_{dis}-T_{con}$.

Optionally, the method further includes controlling the opening degree of the valve body of the electronic expansion valve by a larger value based on the first control parameter $Ctrl_{suc}$ and the second control parameter $Ctrl_{dis}$.

BRIEF DESCRIPTION OF THE DRAWINGS

The contents of the present disclosure will become easier to understand with reference to the accompanying drawings.

It can be easily understood by those skilled in the art that the drawings are merely used for illustration, and are not intended to limit the scope of protection of the present disclosure. In addition, like parts are denoted by like numerals in the drawings, wherein.

DETAILED DESCRIPTION OF THE EMBODIMENT(S) OF THE INVENTION

It will be readily understood that, based on the technical solutions of the present disclosure, those skilled in the art can propose various alternative structural forms and implementations without departing from the true spirit of the present disclosure. Therefore, the following specific embodiments and the accompanying drawings are merely exemplary description of the technical solutions of the present disclosure, which shall not be deemed as the entirety of the present disclosure or as limiting or restricting the technical solutions of the present disclosure.

Such orientational terms as "upper", "lower", "left", "right", "front", "rear", "front side", "back side", "top", "bottom" or the like that are mentioned or may be mentioned in this description are defined with respect to the configurations shown in the individual drawings. They are relative concepts and thus possibly vary according to their different locations or different states of use. Therefore, these or other orientational terms shall not be interpreted as limiting terms.

Figure 1:
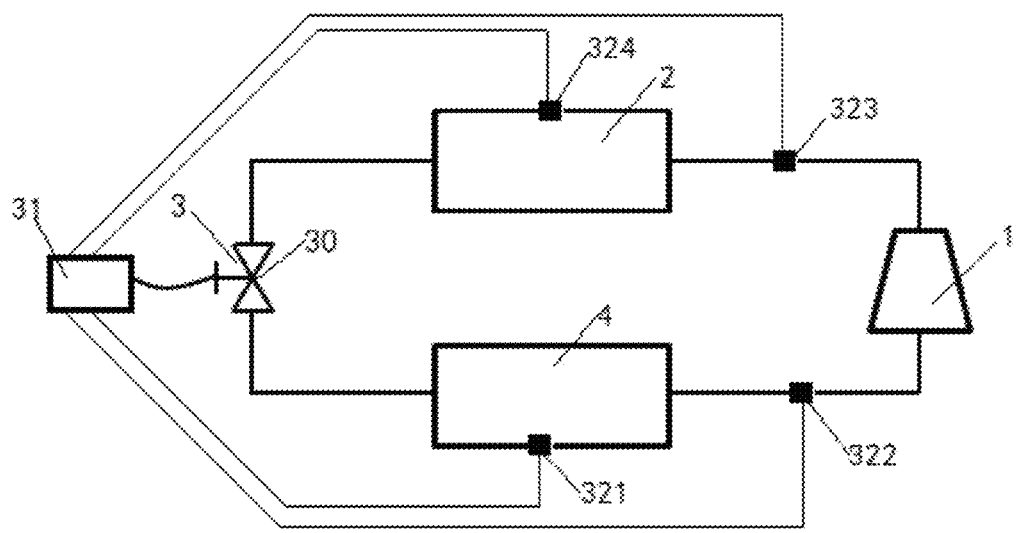
FIG. 1 shows a schematic view of a heat exchange system according to an embodiment of the present disclosure.

As shown in FIG. 1, a heat exchange system according to an embodiment of the present disclosure includes a compressor 1, which may be, for example, a common compressor or a variable frequency compressor. An outlet side or discharge side of the compressor is connected to a condenser 2, the condenser 2 is further connected to an electronic expansion valve 3, the electronic expansion valve 3 is further connected to an evaporator 4, and the evaporator 4 is further connected to an inlet side or suction side of the compressor 1, thereby forming a cooling/heating cycle.

The electronic expansion valve 3 according to the embodiment of the present disclosure includes: a valve body 30; a first temperature sensor 321 configured to detect an evaporator temperature $T_{eva}$; a second temperature sensor 322 configured to detect a compressor inlet temperature $T_{suc}$; a third temperature sensor 323 configured to detect a compressor outlet temperature $T_{dis}$; a fourth temperature sensor 324 configured to detect a condenser temperature $T_{con}$; and a controller 31, wherein the controller 31 is associated with the first temperature sensor 321, the second temperature sensor 322, the third temperature sensor 323 and the fourth temperature sensor 324 respectively, and adjusts an opening degree of the valve body 30 based on temperature signals from the first temperature sensor 321, the second temperature sensor 322, the third temperature sensor 323 and the fourth temperature sensor 324. Different from existing devices, the electronic expansion valve according to the embodiment of the present disclosure controls the opening degree of the expansion valve completely based on the temperature, and there is no need to collect pressure signals in the system, so that expensive pressure sensors in the conventional electronic expansion valves may be saved. In some embodiments, the electronic expansion valve may not include pressure sensors, which may be completely replaced by lower-priced temperature sensors, thereby reducing the overall cost of the electronic expansion valve.

The valve body 30 has a spool and a valve seat. For example, the spool may be in the form of a needle valve or a ball valve, and is connected to a stepper motor for example. Therefore, the opening degree of the valve body 30 may be controlled by the operation of the stepper motor. The controller 31 may control the operation of the stepper motor based on programmable control software, thereby controlling the opening degree of the valve body 30 and a flow rate of a refrigerant passing through the valve body 30.

Figure 2:
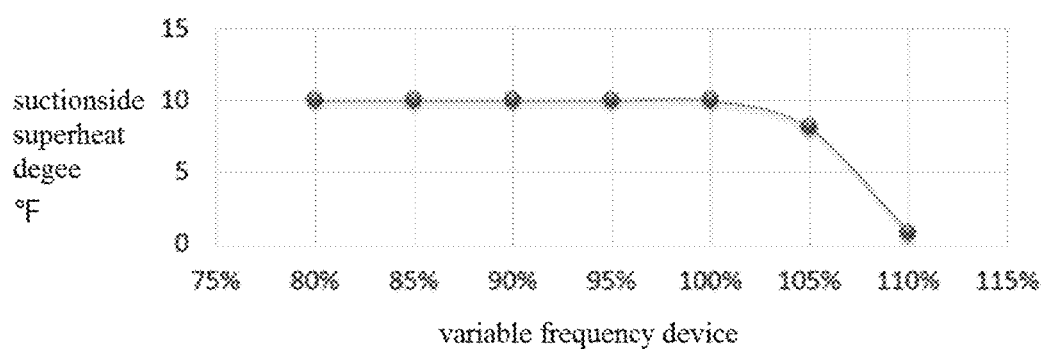
FIG. 2 is a curve showing a relationship between a compressor load ratio and a suction-side superheat degree in a heat exchange system according to an embodiment of the present disclosure.
Figure 3:
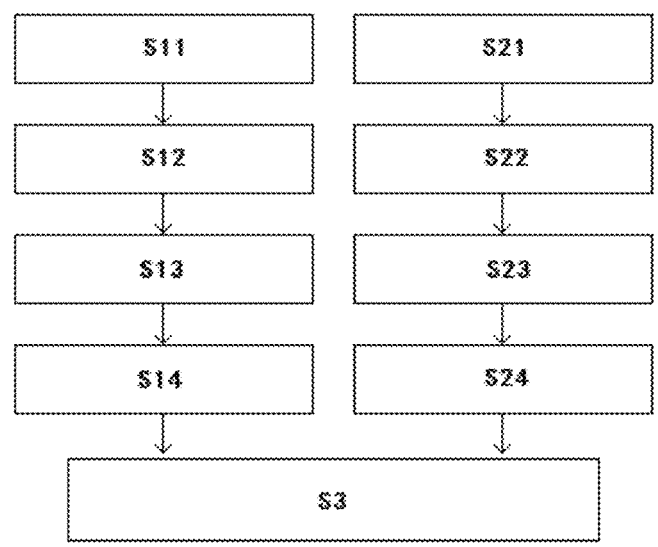
FIG. 3 shows a method for controlling an opening degree of an electronic expansion valve according to an embodiment of the present disclosure.

In some embodiments, the controller 31 controls the opening degree of the valve body 30 based on a first control parameter $Ctrl_{suc}$ and/or a second control parameter $Ctrl_{dis}$. The first control parameter $Ctrl_{suc}$ is related to the evaporator temperature $T_{eva}$ and the compressor inlet temperature $T_{suc}$, and the second control parameter $Ctrl_{dis}$ is related to the compressor outlet temperature $T_{dis}$ and the condenser temperature $T_{con}$. The first control parameter $Ctrl_{suc}$ is a function of a first difference $\Delta SH_{suc}$ between a suction-side superheat degree $SH_{suc}$ and a set value $SH_{sp1}$ of the suction-side superheat degree, wherein the suction-side superheat degree $SH_{suc}=T_{suc}-T_{eva}$. In some embodiments, $Ctrl_{suc}$ is a proportional integral function of the first difference $\Delta SH_{suc}$. In some embodiments, the second control parameter $Ctrl_{dis}$ is a function of a second difference $\Delta SH_{dis}$ between a discharge-side superheat degree $SH_{dis}$ and a set value $SH_{sp2}$ of the discharge-side superheat degree, wherein the discharge-side superheat degree $SH_{dis}=T_{dis}-T_{eva}$. In some embodiments, $Ctrl_{dis}$ is a proportional integral function of the second difference $\Delta SH_{dis}$. In some embodiments, the controller 31 determines the opening degree of the valve body 30 based on both the first control parameter $Ctrl_{suc}$ and the second control parameter $Ctrl_{dis}$; for example, the controller 31 processes the first control parameter $Ctrl_{suc}$ and the second control parameter $Ctrl_{dis}$ based on an average value, a weighted average value or a smaller value of the two or in other suitable ways, to obtain a final control parameter. In some embodiments, the controller 31 controls the opening degree of the valve body 30 by a larger value based on the first control parameter $Ctrl_{suc}$ and the second control parameter $Ctrl_{dis}$. For example, if the opening degree of the valve body 30 needs to be set at 40% based on the first control parameter $Ctrl_{suc}$ and the opening degree of the valve body 30 needs to be set at 60% based on the second control parameter $Ctrl_{dis}$, then the controller will control the opening degree of the valve body 30 to be at 60% based on the second control parameter $Ctrl_{dis}$. Therefore, the electronic control valve according to the embodiment of the present disclosure controls the opening degree of the valve body 30 in real time based on the superheat degree conditions on both the suction side of the compressor and the discharge side of the compressor, which is advantageous for the heat exchange system to adapt to various operating conditions, e.g., the operating conditions during startup, low-power operating conditions, or large ambient temperature spans. With continued reference to FIG. 2, the suction-side superheat degrees of the heat exchange system according to the present disclosure at different compressor frequencies are shown. In this embodiment, the set value $SH_{sp1}$ of the suction-side superheat degree is set to 10° F., and the set value $SH_{sp2}$ of the discharge-side superheat degree is set to 55° F. It can be seen from this curve that when the compressor works at different frequencies, the suction-side superheat degree $SH_{suc}$ will be controlled to be equal to or smaller than the set value $SH_{sp1}$ (10° F.) of the suction-side superheat degree. In some operating conditions, the suction-side superheat degree $SH_{suc}$ will be close to or equal to zero, and at the same time the discharge-side superheat degree is controlled at the set value $SH_{sp2}$ (55° F.) of the discharge-side superheat degree to ensure that no liquid is compressed in the compressor.

An embodiment according to the present disclosure further provides a heat exchange system, which includes: a compressor 1; a condenser 2 connected to an outlet of a compressor; the electronic expansion valve 3 according to the embodiment of the present disclosure, disposed downstream of the condenser 2; and an evaporator 4 downstream of the electronic expansion valve 3 and connected to an inlet of the compressor 1, thereby forming a cooling or heating cycle system. In some embodiments, the first temperature sensor 321 is disposed in the evaporator 4, such as on a wall of evaporator coils, the second temperature sensor is disposed between the evaporator 4 and the inlet of the compressor 1, such as on a wall of a pipe or in the pipe therebetween, the third temperature sensor 323 is disposed between the outlet of the compressor 1 and the condenser 2, such as on a wall of a pipe or in the pipe therebetween, and the fourth temperature sensor 324 is disposed in the condenser 2, such as on the wall of or in the condenser coils. Each of the temperature sensors 321, 322, 323 and 324 is capable of communicating with the controller 31 through a wired or wireless network, thereby feeding back temperature information at each location in real time.

According to some embodiments of the present disclosure, a method for controlling an opening degree of an electronic expansion valve in a heat exchange system is further provided, the method including: S11 setting a set value $SH_{sp1}$ of a suction-side superheat degree and S21 setting a set value $SH_{sp2}$ of a discharge-side superheat degree; S12 obtaining the suction-side superheat degree $SH_{suc}$ and S22 obtaining the discharge-side superheat degree $SH_{dis}$; S13 calculating a first difference $\Delta SH_{suc}$ between the suction-side superheat degree $SH_{suc}$ and the set value $SH_{sp1}$ of the suction-side superheat degree, and S14 calculating a first control parameter $Ctrl_{suc}$ based on the first difference $\Delta SH_{suc}$; S23 calculating a second difference $\Delta SH_{dis}$ between the discharge-side superheat degree $SH_{dis}$ and the set value $SH_{sp2}$ of the discharge-side superheat degree, and calculating a second control parameter $Ctrl_{dis}$ based on the second difference $\Delta SH_{dis}$; and S3 controlling an opening degree of a valve body of the electronic expansion valve based on the first control parameter $Ctrl_{suc}$ and/or the second control parameter $Ctrl_{dis}$. In some embodiments, the step of obtaining the suction-side superheat degree $SH_{suc}$ includes: collecting an evaporator temperature $T_{eva}$ and a compressor inlet temperature $T_{suc}$ using temperature sensors, respectively; and calculating the suction-side superheat degree $SH_{suc}$ by using a formula $SH_{suc}=T_{suc}-T_{eva}$. In some embodiments, the step of obtaining the discharge-side superheat degree $SH_{dis}$ includes: collecting a compressor outlet temperature $T_{dis}$ and a condenser temperature $T_{con}$ using temperature sensors, respectively; and calculating the discharge-side superheat degree $SH_{dis}$ by using a formula $SH_{dis}=T_{dis}-T_{con}$. In some embodiments, the opening degree of the valve body 30 of the electronic expansion valve may be controlled by an average value, a weighted average value, a larger value or a smaller value based on the first control parameter $Ctrl_{suc}$ and the second control parameter $Ctrl_{dis}$.

The specific embodiments described above are merely for describing the principle of the present disclosure more clearly, and various components are clearly illustrated or depicted to make it easier to understand the principle of the present disclosure. Those skilled in the art can readily make various modifications or changes to the present disclosure without departing from the scope of the present disclosure. Therefore, it should be understood that these modifications or changes should be included within the scope of protection of the present disclosure.

What is claimed is:

1. An electronic expansion valve, comprising:
   a valve body;
   a first temperature sensor configured to detect an evaporator temperature $T_{eva}$;
   a second temperature sensor configured to detect a compressor inlet temperature $T_{suc}$;
   a third temperature sensor configured to detect a compressor outlet temperature $T_{dis}$;
   a fourth temperature sensor configured to detect a condenser temperature $T_{con}$; and
   a controller, which is associated with the first temperature sensor, the second temperature sensor, the third temperature sensor and the fourth temperature sensor, and which adjusts an opening degree of the valve body based on temperature signals from the first temperature sensor, the second temperature sensor, the third temperature sensor and the fourth temperature sensor;
   wherein the controller adjusts the opening degree of the valve body without a measurement from a pressure sensor.

2. The electronic expansion valve according to claim 1, wherein the controller controls the opening degree of the valve body based on a first control parameter $Ctrl_{suc}$ and a second control parameter $Ctrl_{dis}$, and wherein the first control parameter $Ctrl_{suc}$ is related to the evaporator temperature $T_{eva}$ and the compressor inlet temperature $T_{suc}$, and the second control parameter $Ctrl_{dis}$ is related to the compressor outlet temperature $T_{dis}$ and the condenser temperature $T_{con}$.

3. The electronic expansion valve according to claim 2, wherein the first control parameter $Ctrl_{suc}$ is a function of a first difference between a suction-side superheat degree $SH_{suc}$ and a set value $SH_{sp1}$ of the suction-side superheat degree, and the suction-side superheat degree $SH_{suc}=T_{suc}-T_{eva}$; and the second control parameter $Ctrl_{dis}$ is a function of a second difference between a discharge-side superheat degree $SH_{dis}$ and a set value $SH_{sp2}$ of the discharge-side superheat degree, and the discharge-side superheat degree $SH_{dis}=T_{dis}-T_{con}$.

4. The electronic expansion valve according to claim 2, wherein the controller controls the opening degree of the valve body by a larger one of the first control parameter $Ctrl_{suc}$ and the second control parameter $Ctrl_{dis}$.

5. A heat exchange system, comprising:
   a compressor;
   a condenser connected to an outlet of the compressor;
   an electronic expansion valve according to claim 1, disposed downstream of the condenser; and
   an evaporator downstream of the electronic expansion valve, the evaporator being connected to an inlet of the compressor.

6. The system according to claim 5, wherein the first temperature sensor is disposed in the evaporator, the second temperature sensor is disposed between the evaporator and the inlet of compressor, the third temperature sensor is disposed between the outlet of the compressor and the condenser, and the fourth temperature sensor is disposed in the condenser.

7. A method for controlling an electronic expansion valve, comprising:
- setting a set value $SH_{sp1}$ of a suction-side superheat degree and a set value $SH_{sp2}$ of a discharge-side superheat degree;
- obtaining the suction-side superheat degree $SH_{suc}$ and the discharge-side superheat degree $SH_{dis}$;
- calculating a first difference between the suction-side superheat degree $SH_{suc}$ and the set value $SH_{sp1}$ of the suction-side superheat degree, and calculating a first control parameter $Ctrl_{suc}$ based on the first difference; and calculating a second difference between the discharge-side superheat degree $SH_{dis}$ and the set value $SH_{sp2}$ of the discharge-side superheat degree, and calculating a second control parameter $Ctrl_{dis}$ based on the second difference; and
- controlling an opening degree of a valve body of the electronic expansion valve based on the first control parameter $Ctrl_{suc}$ and/or the second control parameter $Ctrl_{dis}$ wherein the controlling the opening degree of the valve body of the electronic expansion valve does not use a pressure measurement.

8. The method according to claim 7, wherein the step of obtaining the suction-side superheat degree $SH_{suc}$ comprises:
- collecting an evaporator temperature $T_{eva}$ and a compressor inlet temperature $T_{suc}$ using temperature sensors; and calculating the suction-side superheat degree $SH_{suc}$ by using a formula $SH_{suc}=T_{suc}-T_{eva}$; and the step of obtaining the discharge-side superheat degree $SH_{dis}$ comprises:
- collecting a compressor outlet temperature $T_{dis}$ and a condenser temperature $T_{con}$ using temperature sensors; and calculating the discharge-side superheat degree $SH_{dis}$ by using a formula $SH_{dis}=T_{dis}-T_{con}$.

9. The method according to claim 7, further comprising controlling the opening degree of the valve body of the electronic expansion valve by a larger one of the first control parameter $Ctrl_{suc}$ and the second control parameter $Ctrl_{dis}$.

* * * * *